United States Patent
Kim

(10) Patent No.: US 6,554,242 B2
(45) Date of Patent: Apr. 29, 2003

(54) GRADE CONTROL APPARATUS OF DISPLAY SET FOR TAPESTRY

(75) Inventor: Sang Wook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/160,157

(22) Filed: Jun. 4, 2002

(65) Prior Publication Data

US 2002/0179801 A1 Dec. 5, 2002

(30) Foreign Application Priority Data

Jun. 5, 2001 (KR) .......................... 2001/31483

(51) Int. Cl.$^7$ ................................. E04G 3/00
(52) U.S. Cl. ............... 248/371; 248/923; 248/286.1; 211/100; 211/104
(58) Field of Search ............... 248/919, 922, 248/923, 404, 405, 274.1, 276.1, 278.1, 279.1, 280.11, 281.11, 188.6, 371, 372.1, 393, 398, 920, 284.1, 286.1, 291.1, 292.12, 292.13; 211/96, 99, 100, 108

(56) References Cited

U.S. PATENT DOCUMENTS

| | | | | |
|---|---|---|---|---|
| 2,828,098 A | * | 3/1958 | Lehmann | 248/292.13 |
| 4,527,766 A | * | 7/1985 | Krenz | 248/371 |
| 4,604,955 A | * | 8/1986 | Fleischer et al. | 108/147 |
| 4,960,256 A | * | 10/1990 | Chihara et al. | 248/286.1 |
| 5,715,138 A | * | 2/1998 | Choi | 361/681 |
| 6,021,720 A | * | 2/2000 | Boos et al. | 108/44 |
| 6,098,952 A | * | 8/2000 | Tonn | 248/688 |
| 6,378,446 B1 | * | 4/2002 | Long | 108/147 |
| 2002/0033436 A1 | * | 8/2001 | Peng et al. | |

* cited by examiner

Primary Examiner—Ramon O Ramirez
Assistant Examiner—Jon Szumny
(74) Attorney, Agent, or Firm—Fleshner & Kim, LLP

(57) ABSTRACT

A grade control apparatus of display set for tapestry. The apparatus includes at least two guide brackets attached to a wall; holding-down brackets for holding a display device, each having one end being pivotably connected to one end of the corresponding guide bracket; adjusting link transmission shafts installed within each guide bracket, each having one end on which a bevel gear is installed and the other end on which a shifting boss is installed; an angle adjustable shaft being installed between the guide brackets and having gears for being engaged with each bevel gear; and an angle adjustable hand lever for receiving an external force, the angle adjustable hand lever being formed on at least one angle adjustable shaft. The present invention easily adjusts the angle of the display device so as to comply with a user's wishes, and finely adjusts the angle of the display device by a small force.

13 Claims, 4 Drawing Sheets

(A)

(B)

GRADE CONTROL APPARATUS OF DISPLAY SET FOR TAPESTRY

BACKGROUND OF THE INVENTION

1. Field of the Invention

The present invention relates to a grade control apparatus of display set for tapestry, and more particularly to a grade control apparatus of display set for tapestry, in which the view angle of a wall-mounted display device is easily adjusted so as to comply with a user's wishes.

2. Description of the Related Art

Typically, thin-type display devices such as Liquid Crystal Display (LCD) TVs or Plasma Display Panel (PDP) TVs are fixed to a wall, i.e., in a built-in mode, thereby maximizing space utilization. This built-in mode does not generate an unnecessary gap between the back surface of the display device and the wall, thereby improving installation efficiency.

However, with this built-in type display device, in case the user wants to adjust a view angle of the display device fixed to the wall, the display device must be entirely detached from the wall. Then, after adjusting the view angle of the display device, the display device must be again attached to the wall. Therefore, this procedure is very inconvenient to the user as well as causes damage to the wall.

Therefore, in order to solve the aforementioned problems, various apparatuses for supporting the thin-type display device so as to adjust the view angle of the display device have been developed.

FIG. 1 is a perspective view of a conventional apparatus for adjusting a tilt angle of a wall-mounted display device.

With reference to FIG. 1 the conventional apparatus for adjusting the tilt angle of the wall-mounted display device comprises a fixture 1, a pair of supporters 2, and link members 3. The fixture 1 is attached to a wall. One end of each supporter 2 is pivotably connected to the fixture 1. The link members 3 serve to connect the supporters 2 to the fixture 1.

A thin-type display device D is interposed between two supporters 2, thereby being installed on the conventional apparatus for adjusting the tilt angle of the display device. The supporters 2 provided with the display device D are spread or folded, thereby adjusting the view angle of the display device D.

Herein, an angle of spreading or folding the supporter 2 is restricted by the link member 3, which moves along the supporter 2.

According to the above-described link system supporting apparatus, the view angle of the display device D is adjusted by spreading and folding the supporters 2. Then, the adjusted angle of the display device D is fixed by the link members 3.

However, since the display device D is very heavy, women or old and feeble persons cannot easily adjust the view angle of the display device D using the above-described link system supporting apparatus.

Although the view angle of the display device D is adjusted, it is not easy to finely adjust the view angle of the display device D as to comply with the user's wishes.

SUMMARY OF THE INVENTION

Therefore, the present invention has been made in view of the above problems, and it is an object of the present invention to provide a grade control apparatus of display set for tapestry, which easily controls the view angle of the display so as to comply with a user's wishes.

In accordance with the present invention, the above and other objects can be accomplished by the provision of a grade control apparatus of display set for tapestry, comprising: at least two guide brackets attached to a wall; holding-down brackets for holding a display device, each having one end being pivotably connected to one end of the corresponding guide bracket; adjusting link transmission shafts installed within each guide bracket, each having one end on which a bevel gear is installed and the other end on which a shifting boss is installed; an angle adjustable shaft being installed between the guide brackets and having gears for being engaged with each bevel gear; and an angle adjustable hand lever for receiving an external force, the angle adjustable hand lever being formed on at least one angle adjustable shaft.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the accompanying drawings.

Figure 1:
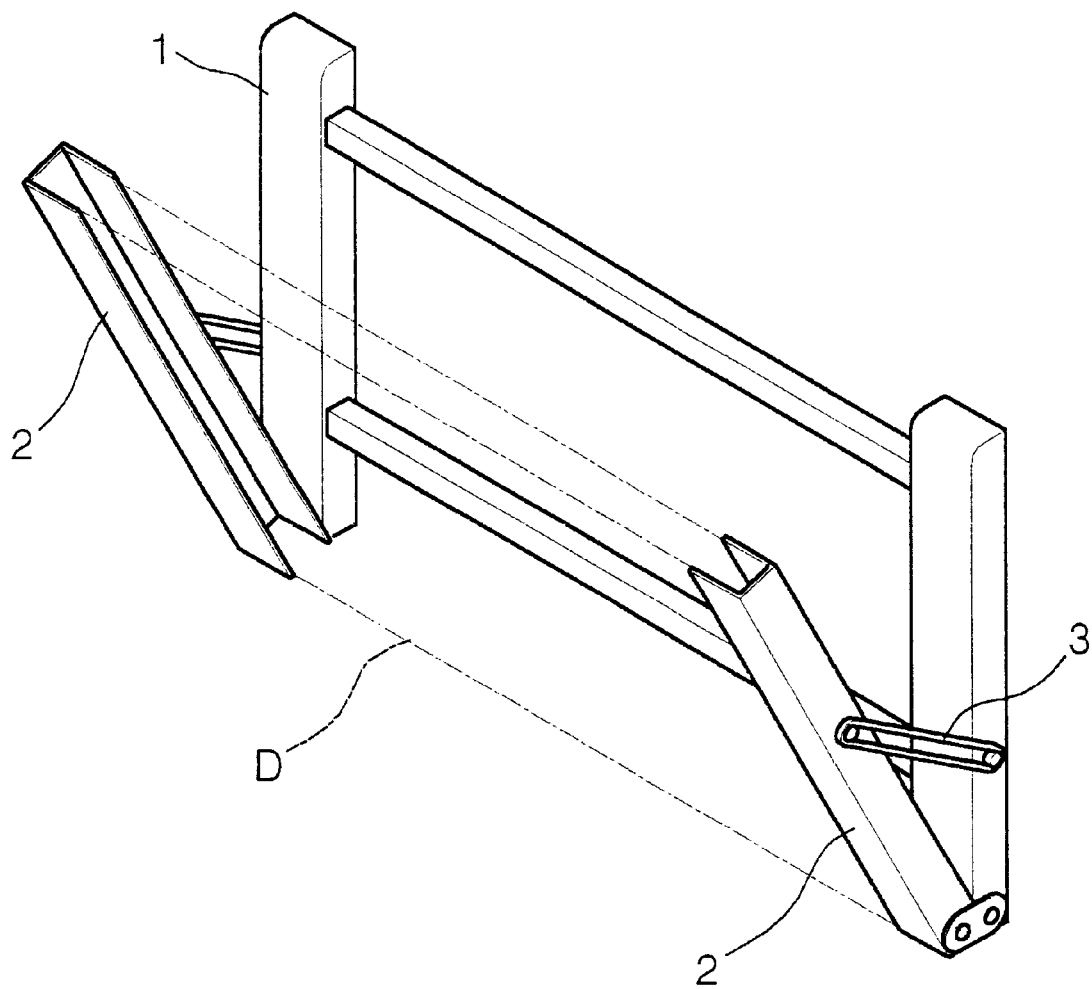
FIG. 1 is a perspective view of a conventional grade control apparatus of display set for tapestry.
Figure 2:
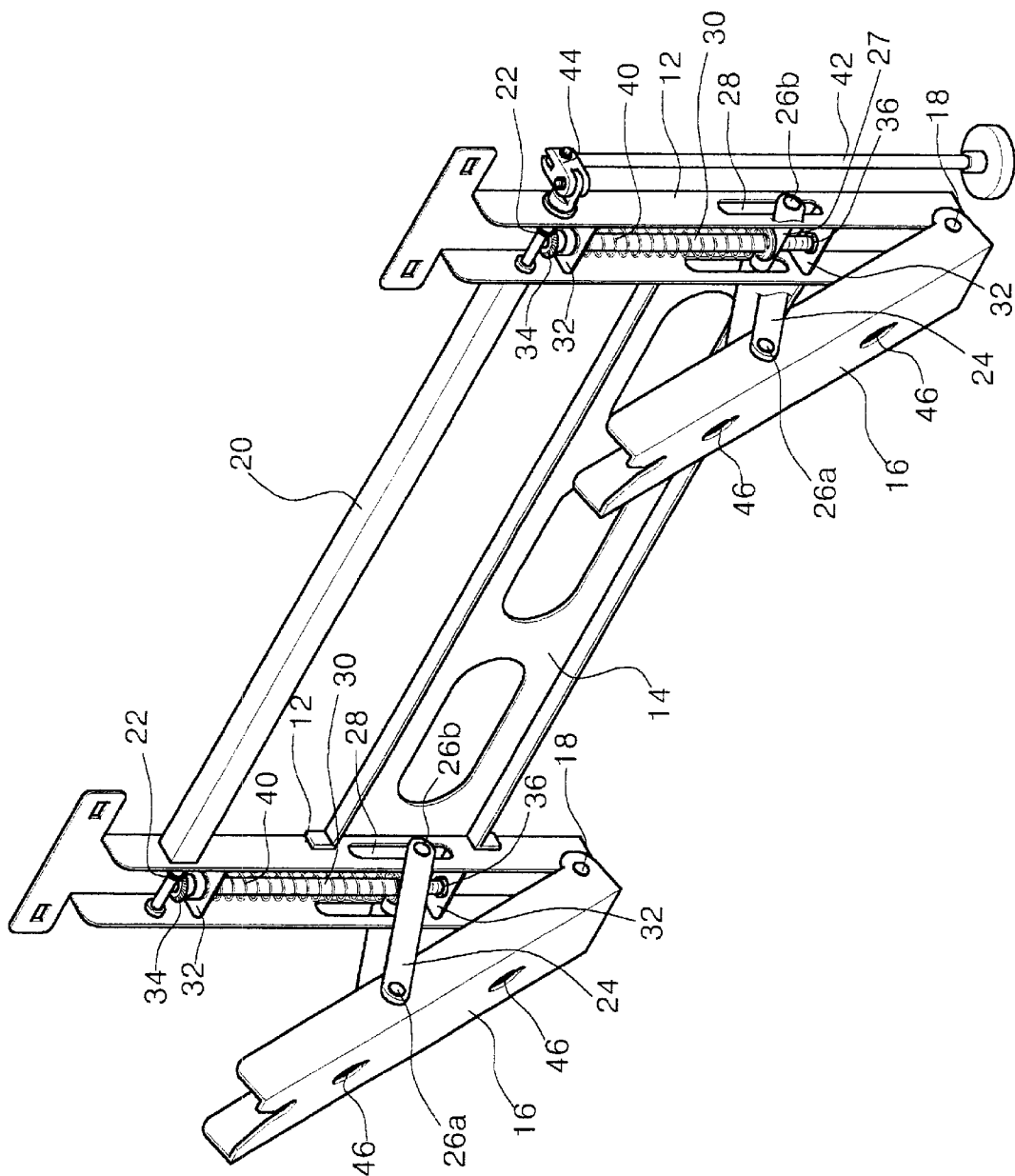
FIG. 2 is a perspective view of a grade control apparatus of display set for tapestry in accordance with the present invention.

FIG. 2 is a perspective view of a grade control apparatus of display set for tapestry in accordance with the present invention.

With reference to FIG. 2, the a grade control apparatus of display set for tapestry of the present invention comprises at least two guide brackets 12, holding-down brackets 16, adjusting link transmission shafts 30, a angle adjustable shaft 20, and a angle adjustable hand lever 42. The guide brackets 12 are attached to a wall. One end of each holding-down bracket 16 is pivotably connected to one end of the guide bracket 12. A display device will be installed on two holding-down brackets 16. The adjusting link transmission shaft 30 is installed within the guide bracket 12. A bevel gear 34 is installed on one end of the adjusting link transmission shaft 30 and a shifting boss 27 is installed on the other end of the adjusting link transmission shaft 30. The angle adjustable shaft 20 is installed between two guide brackets 12. A gear 22 is formed on both ends of the angle adjustable shaft 20 and is engaged with the bevel gear 34 of each adjusting link transmission shaft 30. The angle adjustable hand lever 42 for receiving an external force is formed on at least one angle adjustable shaft 20.

In more detail, two guide brackets 12 are spaced from each other by a designated distance and are fixed to a bracket breadboard 14.

The angle adjustable shaft 20 is interposed between two guide brackets 12 above the bracket breadboard 14. Therefore, when the adjusting link transmission shaft 30 within one guide bracket 12 is rotated, the adjusting link transmission shaft 30 within the other guide bracket 12 is also rotated by the angle adjustable shaft 20.

One end of the holding-down bracket 16 is pivotably connected to one end of the guide bracket 12.

That is, one end of the guide bracket 12 and one end of the corresponding holding-down bracket 16 are connected to each other by a hinge pin 18. One end of an angle adjustable link 24 is connected to a designated location of the guide bracket 12 and the other end of the angle adjustable link 24 is connected to a designated location of the holding-down bracket 16. Herein, the angle adjustable link 24 is formed to have a predetermined length.

Each of opposite ends of the angle adjustable link 24 is fixed to the guide bracket 12 and the holding-down bracket 16 by pins 26a and 26b, respectively. Thereby, the guide bracket 12 can be spread from or folded into the holding-down bracket 16.

A longitudinal hole 28 for moving the shifting boss 27 within a designated distance is formed on both side surfaces of the guide bracket 12.

Through holes 46 for holding the display device are formed on the front surface of each holding-down bracket 16.

Herein, the shape of the through hole 46 of the holding-down bracket 16 may be variously formed. For example, the shape of the through hole 46 of the holding-down bracket 16 may be a square or a circle.

Preferably, the through hole 46 comprises a circular insertion portion and a long slot portion integrally formed under the insertion portion. The slot portion has a designated size so that a head 61 of a latch bolt 60 (FIGS. 4a and 4b) is passed therethrough. Further, the slot portion has a width smaller than the diameter of the head 61 and bigger than the diameter of a neck 62.

The through hole 46 of the holding-down bracket 16 serves to hold the display device. Instead of the through hole 46, other units for holding the display device may be attached to or formed on the holding-down bracket 16.

The angle adjustable hand lever 42 is connected to one angle adjustable shaft 20, thereby easily rotating the angle adjustable shaft 20.

A universal joint 44 is inserted between the angle adjustable shaft 20 and the angle adjustable hand lever 42, thereby rotating the angle adjustable shaft 20 within a designated range.

Figure 3:
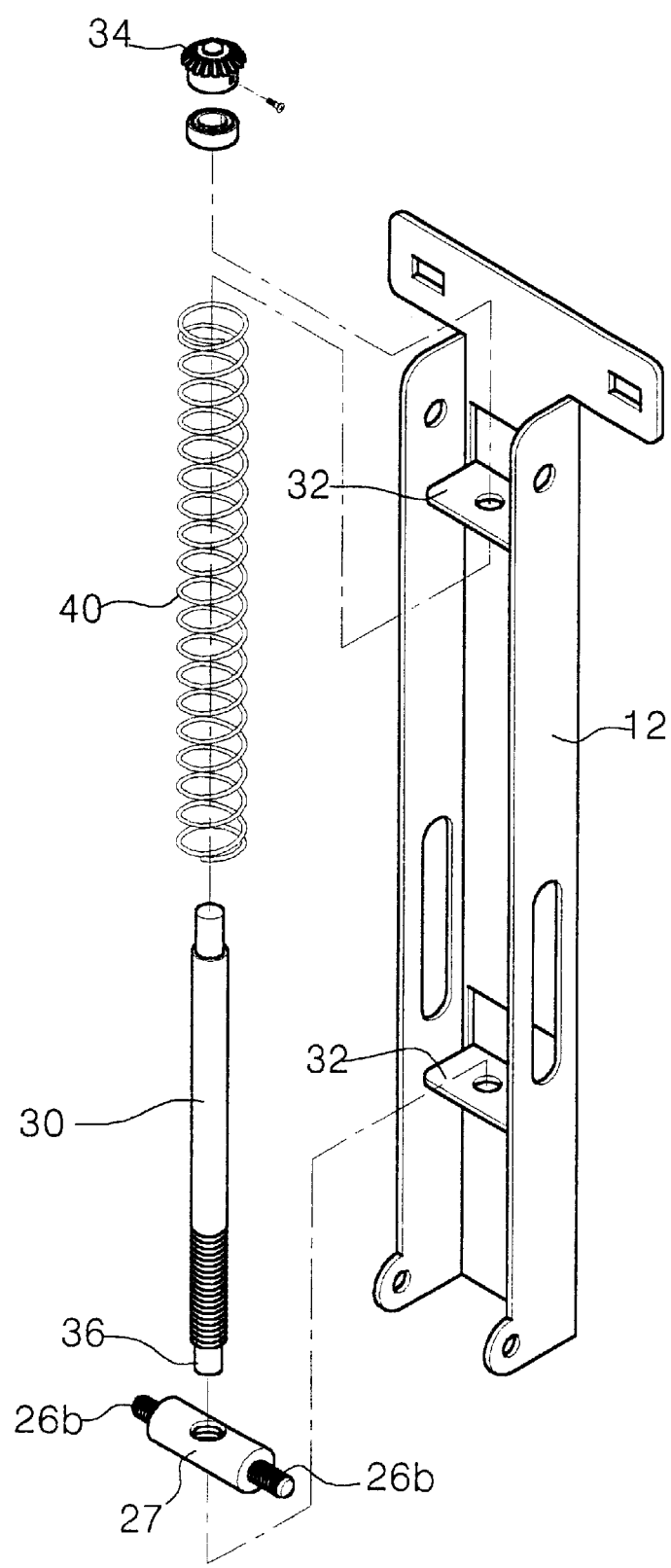
FIG. 3 is an exploded perspective view of a guide bracket of the grade control apparatus of display set for tapestry in accordance with the present invention.

FIG. 3 is an exploded perspective view of the guide bracket of the grade control apparatus of display set for tapestry in accordance with the present invention.

Hereinafter, with reference to FIGS. 2 and 3, the guide bracket 12 will be described in detail.

Two holders 32 are formed within the guide bracket 12. The holders 32 are spaced from each other by a designated distance. A via hole for inserting the adjusting link transmission shaft 30 is formed on each holder 32. Therefore, the adjusting link transmission shaft 30 is installed between two holders 32.

The adjusting link transmission shaft 30 is formed as a bolt shape with a spiral screw thread on its outer surface.

The bevel gear 34 is formed on the top surface of the adjusting link transmission shaft 30 and interlocked with the adjusting link transmission shaft 30.

A washer (not shown) and a bearing (not shown) are installed between the upper holder 32 and the bevel gear 34, thereby smoothly rotating the adjusting link transmission shaft 30.

Further, the gear 22 connected to the angle adjustable shaft 20 is disposed above the bevel gear 34. The gear 22 is engaged with the bevel gear 34 of the adjusting link transmission shaft 30.

The universal joint 44 is installed between the angle adjustable shaft 20 and the angle adjustable hand lever 42. The universal joint 44 allows the user to rotate the angle adjustable hand lever 42 from a convenient location of the user as well as to transmit a rotary force. However, instead of the universal joint 44, other units may be formed to transmit the rotary force.

A power unit system such as a motor, and a controlling means may be attached to a designated location of the angle adjustable shaft 20, thereby automatically rotating the angle adjustable shaft 20 without the manipulation of the angle adjustable hand lever 42.

The shifting boss 27 is installed above the lower holder 32 of the guide bracket 12. A through hole is formed on the center of the shifting boss 27.

The inner wall of the through hole of the shifting boss 27 is tapped, thereby being coupled with the adjusting link transmission shaft 30 in a bolt-nut joint manner.

The angle adjustable link 24 is fixed to both ends of the shifting boss 27 by pins 26b.

The adjusting link transmission shaft 30 is inserted into the through hole of the shifting boss 27 so that a supporting end 36 of the adjusting link transmission shaft 30 passes through the through hole of the shifting boss 27. Thereby, the supporting end 36 having passed through the through hole of the shifting boss 27 is connected to the lower holder 32.

The adjusting link transmission shaft 30 between the shifting boss 27 and the upper holder 32 is surrounded by a compression spring 40.

Hereinafter, with reference to the aforementioned constitution, the operation of the guide bracket 12 is described.

The angle adjustable shaft 20 connected to the universal joint 44 is rotated by turning the angle adjustable hand lever 42 in a designated direction.

Simultaneously, the gear 22 formed on the angle adjustable shaft 20 is rotated and the bevel gear 34 engaged with the gear 22 is also rotated.

Since the bevel gear 34 is connected to the adjusting link transmission shaft 30, the adjusting link transmission shaft 30 is rotated by the rotation of the bevel gear 34.

When the adjusting link transmission shaft 30 is rotated, the shifting boss 27 moves up and down along the adjusting link transmission shaft 30.

Herein, the shafting boss 27 moves up and down within a range of the longitudinal hole 28 formed on the guide bracket 12.

When the shafting boss 27 moves up, the compression spring 40 surrounding the adjusting link transmission shaft 30 between the shifting boss 27 and the upper holder 32 is compressed and constricted, and when the shafting boss 27 moves down, the compression spring 40 pushes the shafting boss 27 by the compressed pressure.

Figure 4:
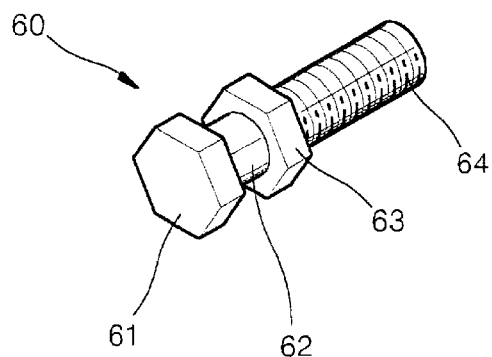
FIGS. 4a and 4b are perspective views showing each embodiment of a latch bolt for connecting a display device to a holding-down bracket of a grade control apparatus of display set for tapestry in accordance with the present invention.
Figure 4:
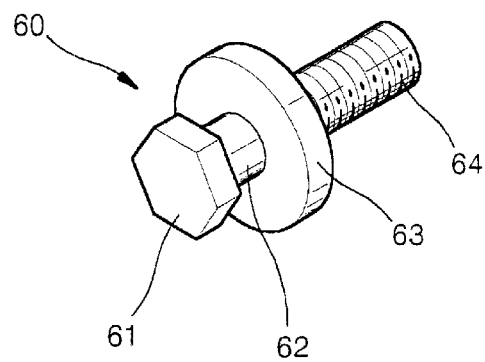

FIGS. 4a and 4b are perspective views showing each embodiment of the latch bolt for connecting the display device to the holding-down bracket of the grade control apparatus of display set for tapestry in accordance with the present invention.

With reference to FIGS. 4a and 4b, the latch bolt 60 comprises a body 64 with a screw thread formed on its outer surface, the head 61 formed on one end of the body 64, an auxiliary head 63 separated from the head 61, and the neck 62 formed between the head 61 and the auxiliary head 63. That is, the latch bolt 60 is a double head type.

Hereinafter, a method of connecting the display device to the grade control apparatus of display set for tapestry of the present invention using the above-described latch bolt is described.

The body 64 of the latch bolt 60 is jointed to the back surface of the display device. Then, the head 61 of the latch bolt 60 is inserted into the through hole 46 of the holding-down bracket 16.

Herein, the auxiliary head 63 is not inserted into the through hole 46. That is, the auxiliary head 63 is located outside the through hole 46.

The display device is moved so that the neck 62 of the latch bolt 60 is inserted into the slot portion of the through hole 46, thereby hanging the head 61 of the latch bolt 60 on the holding-down bracket 16.

The latch bolt 60 is hung on the holding-down bracket 16 through the head 61 and is supported by the auxiliary head 63, thereby securing the hanging state of the display device.

Hereinafter, the operation of the grade control apparatus of display set for tapestry in accordance with the present invention is described.

The guide brackets 12 and the holding-down brackets 16 are fixed to the wall by bolts or so forth. The display device is hung on the holding-down brackets 16 by the aforementioned manner.

In order to spread the holding-down brackets 16, on which the display device is hung, from the guide brackets 12, the angle adjustable hand lever 42 is turned in a designated direction. Then, the angle adjustable shaft 20 is rotated and the bevel gear 34 engaged with the gear 22 formed on the angle adjustable shaft 20 is also rotated.

Since the bevel gear 34 is connected to the adjusting link transmission shaft 30, the adjusting link transmission shaft 30 is rotated by the rotation of the bevel gear 34 and elevates the shifting boss 27.

When the shifting boss 27 moves, the angle adjustable link 24 connected to both ends of the shifting boss 27 also moves.

As the shifting boss 27 moves up, the interlocked angle adjustable link 24 interlocked with the shifting boss 27 moves up. The holding-down bracket 16 is spread from the guide bracket 12 centering on the hinge pin 18, thereby adjusting the view angle of the display device hanging on the holding-down brackets 16.

On the contrary, in order to fold the holding-down brackets 16, on which the display device is hung, into the guide brackets 12, the angle adjustable hand lever 42 is turned in the opposite direction. Then, the angle adjustable shaft 20 is reversibly rotated and the bevel gear 34 engaged with the gear 22 formed on the angle adjustable shaft 20 is reversibly rotated. Then, the adjusting link transmission shaft 30 is reversibly rotated by the rotation of the bevel gear 34. The shifting boss 27 engaged with the adjusting link transmission shaft 30 moves down.

Then, the holding-down bracket 16 is folded into the guide bracket 12 centering on the hinge pin 18, thereby adjusting the view angle of the display device hanging on the holding-down brackets 16.

Herein, the moving range of the shifting boss 27 is the length of the longitudinal hole 28 of the guide bracket 12.

As described above, when the shifting boss 27 moves up so as to adjust the angle of the display device, the compression spring 40 is compressed. That is, when the holding-down bracket 16 is spread from the guide bracket 12, the compression spring 40 is compressed.

When the shifting boss 27 moved up, that is, when the holding-down bracket 16 is spread from the guide bracket 12, since a load due to the weight of the display device is imposed on the holding-down bracket 16, the angle of the display device can be adjusted by a small force.

On the other hand, when the shifting boss 27 moves down, that is, when the holding-down bracket 16 is folded into the guide bracket 12, since the shifting boss 27 is compressed by the elastic force of the compression spring 40, the angle of the display device can be adjusted by turning the angle adjustable hand lever 42 by a small force.

As apparent from the above description, the present invention provides a grade control apparatus of display set for tapestry, in which the universal joint is installed on the angle adjustable shaft and the angle adjustable hand lever, thereby easily adjusting the view angle of the display device according to a user's height.

The compression spring is used to spread and fold the holding-down bracket, thereby adjusting the angle of the display device by a small force.

Further, in the grade control apparatus of display set for tapestry of the present invention, since the angle of the display device is adjusted by the motion of the shifting boss, a desirable view angle of the display device can be finely adjusted.

Moreover, an operational force is transmitted between the adjusting link transmission shaft and the angle adjustable shaft by the engagement between the bevel gear of the adjusting link transmission shaft and the gear of the angle adjustable shaft, thereby simplifying the system for adjusting the angle of the display device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A grade control apparatus of display set for tapestry, said apparatus comprising:

at least two guide brackets attached to a wall;

holding-down brackets for holding a display device, each having one end being pivotably connected to one end of the corresponding guide bracket;

adjusting link transmission shafts installed within each guide bracket, each having one end on which a bevel gear is installed and the other end on which a shifting boss is installed;

an angle adjustable shaft being installed between the guide brackets and having gears for being engaged with each bevel gear; and an angle adjustable hand lever for receiving an external force, said angle adjustable hand lever being formed on at least one angle adjustable shaft.

2. The grade control apparatus of display set for tapestry as set forth in claim 1, wherein through holes for holding the display device are formed on each holding-down bracket.

3. The grade control apparatus of display set for tapestry as set forth in claim 2, wherein the through hole comprises a circular insertion portion and a long slot portion integrally formed under the insertion portion.

4. The grade control apparatus of display set for tapestry as set forth in claim 1, wherein the adjusting link transmission shaft comprises a compression spring compressed by the elevating of the shifting boss by the motion of an adjustable link.

5. The grade control apparatus of display set for tapestry as set forth in claim 1, further comprising a universal joint being installed between the angle adjustable shaft and the angle adjustable hand lever, and serving to rotate the angle adjustable shaft within a designated range.

6. A grade control apparatus of display set for tapestry, said apparatus comprising:
   at least two guide brackets attached to a wall;
   holding-down brackets for holding a display device, each having one end being pivotably connected to one end of the corresponding guide bracket;
   adjusting link transmission shafts installed within each guide bracket, each having one end on which a bevel gear is installed and the other end on which a shifting boss is installed;
   an angle adjustable shaft being installed between the guide brackets and having gears for being engaged with each bevel gear; and
   a power unit system and a controller, being attached to a designated location of the angle adjustable shaft and serving to automatically rotate the angle adjustable shaft.

7. The grade control apparatus of display set for tapestry as set forth in claim 6, wherein through holes for holding the display device are formed on each holding-down bracket.

8. The grade control apparatus of display set for tapestry as set forth in claim 6, wherein the adjusting link transmission shaft comprises a compression spring compressed by the elevating of the shifting boss by the motion of an adjustable link.

9. A grade control apparatus of display set for tapestry, said apparatus comprising:
   latch bolts coupled with the display device;
   holding-down brackets coupled with the latch bolts;
   at least two guide brackets connected to one end of each holding-down bracket and attached to a wall;
   adjusting link transmission shafts installed within each guide bracket, each having one end on which a bevel gear is installed and the other end on which a shifting boss is installed;
   an angle adjustable shaft being installed between the guide brackets and having gears for being engaged with each bevel gear; and
   an angle adjustable hand lever for receiving an external force, said angle adjustable hand lever being formed on at least one angle adjustable shaft.

10. The grade control apparatus of display set for tapestry as set forth in claim 9, wherein the latch bolt is a double head type and comprises:
    a body with a screw thread formed on its outer surface;
    a head formed on one end of the body;
    an auxiliary head separated from the head; and
    a neck formed between the head and the auxiliary head.

11. The grade control apparatus of display set for tapestry as set forth in claim 9, wherein the through hole comprises a circular insertion portion and a long slot portion integrally formed under the insertion portion.

12. The grade control apparatus of display set for tapestry as set forth in claim 9, wherein the adjusting link transmission shaft comprises a compression spring compressed by the elevating of the shifting boss by the motion of an adjustable link.

13. The grade control apparatus of display set for tapestry as set forth in claim 9, further comprising a universal joint being installed between the angle adjustable shaft and the angle adjustable hand lever, and serving to rotate the angle adjustable shaft within a designated range.

* * * * *